Figure 1:
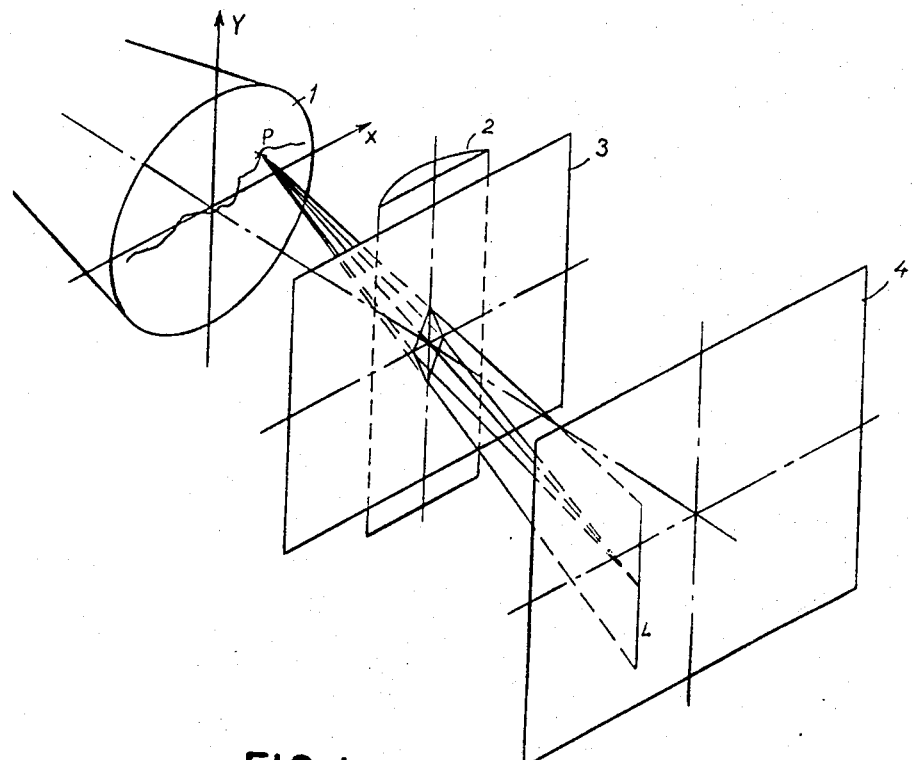

United States Patent
Neergaard

[15] 3,704,939
[45] Dec. 5, 9172

[54] OPTICAL SIGNAL AVERAGING APPARATUS

[72] Inventor: Ejler Baastrup Neergaard, Lystrup, Denmark

[73] Assignee: Niels Erik Guldbaek Kaiser, Vanlose, Denmark

[22] Filed: June 10, 1970

[21] Appl. No.: 45,178

[30] Foreign Application Priority Data

June 10, 1969 Denmark..............................3124/69

[52] U.S. Cl. ...................350/321, 346/110, 350/190, 350/205
[51] Int. Cl. ............................................G02b 27/00
[58] Field of Search......350/181, 190, 205, 206, 321, 350/319; 235/61.6 A, 61.6 B; 346/110

[56] References Cited

UNITED STATES PATENTS

| | | | |
|---|---|---|---|
| 3,014,091 | 12/1961 | McLean | 340/110 R UX |
| 3,193,838 | 7/1965 | Mitchell | 340/110 R |
| 2,142,297 | 1/1939 | Albersheim | 350/206 |
| 2,157,166 | 5/1939 | Dimmick | 350,190 X/ |
| 2,497,952 | 2/1950 | Maurer, Jr. | 350/190 |
| 2,307,210 | 1/1943 | Goldsmith | 350/190 X |

FOREIGN PATENTS OR APPLICATIONS

| | | | |
|---|---|---|---|
| 29,478 | 7/1964 | Germany | 350/190 |

*Primary Examiner*—John K. Corbin
*Attorney*—Cushman, Darby and Cushman

[57] ABSTRACT

An apparatus for optical data processing which conducts a series of computation operations on data, which have an optical representation.

The apparatus provides, by means of optical components, a photographic registration of the mean value or median value of several processes or functions, (signal averaging).

The treatment is based on the use of means for controlled spreading of the luminance in the direction of the amplitude axis, corresponding to the individual amplitude values. The use of controlled unidirectional spreading of luminance is known e.g. in photographic processing of light emission spectra, in the Eindhoven string-galvanometer and sound reproduction cameras.

7 Claims, 5 Drawing Figures

OPTICAL SIGNAL AVERAGING APPARATUS

The invention concerns an apparatus which optically carries out a series of computation operations on data, which have an optical representation.

In many types of metering a graphical represention of the result on an oscillograph with photographic regristration is used or directly registering instruments are employed. However, it is very often desirable to undertake additional various computations on the basis of the directly registered process. Some of the frequently desired computations are the formation of the mean value of several repeated signals being more or less buried in noise. These operations may be carried out by conventional equipment, such as for instance electronic computers. However, it is most frequently rather complicated and expensive equipment required for these computations. The invention aims at, by means of optical components, bringing about a photographic regristration of the mean value or median value of several processes or functions, This treatment, which presupposes that the information is available in amplitudes in oscillograph recording as a function of time or shifting or another plane light-distribution, is according to the invention based on the use of means for controlled spreading of the luminanse in the direction of the amplitude axis, corresponding to the individual amplitude values. This spreading may be attained primarily by superposing the entry information to the oscillograph by a, in relation to the signal, constant high frequency amplitude or secondarily by equipping a camera with a lens- or aperture system undertaking a controlled spreading in the direction of the amplitude axis, but with undisturbed picture formation in the direction of the time- or shifting axis.

The invention uses a data material available as curves or dot collections on an oscillograph screen, a photographic recording corresponding to this or another optical representation system making data of the curve, dot diagram, or histogram type. A few of the applications of the invention use data which are one-dimensionally represented (such as for instance on an oscillograph without $x$-deflection). As representation for these data forms the function $y = f(x)$ or $y = f(t)$ will be used. In the case of some applications, in addition to the above, data representations composed of light dots are also used, also data as density functions on for instance a film strip, a photographic plate, a phototropic glass plate or carried out as moire patterns or rasters. The expression of the optical transmission $T = g(x)$ or $T = g(t)$ refers to these density functions.

Common to all the functions of the invention is a form for means value formation, median value formation, summation or integration.

The invention uses a kind of picture formation of the function $y = f(x)$ on a photographic material, but this picture formation is, in contradistinction to the usual picture formation, not a dot to dot transmission. The picture formation (transmission) is performed by the use of an aperture function producing a controlled spreading of the picture information in the direction of the $y$-axis. Alternatively, the picture transmission may be performed conventionally dot to dot if the controlled spreading of the picture formation is done already on the oscillograph screen.

At the outset, the following will describe the formation of the arithmetical mean value in the direction of the $y$-axis of a number of successively recorded curves $y = f(x)$ on an oscillograph screen by using a photographic camera. In the case of a definite $x$-value $x_0$ the curves will be represented by a number of $y$-values $y_1 \ldots y_i \ldots y_n$ equivalent to light does on the vertical line $x = x_0$.

Now imagine the light dot corresponding to each of these dots $(x, y_i)$ replaced by a light distribution along the vertical line so that the light quantity will be $$I_i(y) = I_0\left(1 - \frac{y - y_i}{a}\right) \quad (1)$$

for $$y_i \leq y \leq y_i + a \quad (2)$$

Here $a$ is a constant chosen in this way that $$y_{max} - y_{min} < a \quad (3)$$

As to values of $y$ in the field (interval)

$$y_{max} < y < y_{min} + a \quad (4)$$

the total light quantity will be $$I(y) = \sum_{i=1}^{n} I_i(y) = n I_0 \left(1 - \frac{y - \frac{1}{n}\Sigma y_i}{a}\right) \quad (5)$$

in which is inserted $$y_{mid} = \frac{1}{n}\sum_{i=1}^{n} y_i \quad (6)$$

$$I(y) = n I_0\left(1 - \frac{y - y_{mid}}{a}\right) \quad (7)$$

It will be seen from this that $I(y)$ in the field (4) has the same values as if all the values $y_i$ were replaced by $y_{mid}$. Therefore, on the basis of $I(y)$ it is possible to determine $y_{mid}$, for instance by ascertaining that $$I\left(y_{mid} + \frac{a}{2}\right) = \frac{1}{2} n I_0.$$

In respect to varying values of $x$ $y_{mid} + a/2$ will always be obtainable as those $y$-values which correspond to the light quantity $\frac{1}{2}nI_0$, and in the case of the photographic reproduction the corresponding blacking value on the film. This method of mean value formation of several processes registered on an oscillograph-screen requires, as already mentioned, a special distribution of the picture information in the direction of the $y$-axis. An original oscillograph curve is converted to a strip with a constantly vertically measured width and with a light intensity decreasing lineary from a definite maximum value towards zero at the edge of the strip. This form of distributing the picture formation may be realized through reproduction in a photographic camera having a cylinder lens carrying out focussing on a horizontal level while the picture formation on the vertical level is defocussed. A dot on the oscillograph screen is hereby shown in a vertical line, the light distribution of which is determined by the aperture employed. The light distribution in the y-direction on the film plane will exactly correspond to the transmission in the aperture opening as a function of the height. Linear weakening towards zero may then be obtained just by allowing the aperture opening to be triangular or rectangular with an inserted grey-wedge with a linearly varying transmission. Instead of merely optically producing this light distribution one may superpose the y-deflection voltage with a, in relation to the signal, high frequency voltage of suitable curve shape (composed of parable pieces), or one may defocus the oscillograph electron-optically to produce the desired light distribution. In these cases a normal photographic camera may be directly used.

If one alters the light distribution around the curve from a triangular to a rectangular intensity cross section (i.e. a sharpedged strip of a constant (vertically measured) height $b$ and a constant intensity $I_o$) it will be seen that the total light distribution of each $x$-value, resulting from the superposed process at $n$, will be stair-shaped, and the light intensity $\frac{1}{2}nI_o$ will be found at a value determining the median value $y_{median}$.

The strip-shaped light distribution required in this case may be optically established by using a cylinder lens plus a rectangular aperture or electrically superposed high frequency triangular voltage. By using other light distributions than the two mentioned other special forms of mean value formation may be obtained.

Another device for attaining the same light distribution as the one obtained through a symmetrical mean value fissure, may be possible by using a lamina system placed close to the film plane or the oscillograph screen. This lamina system may consist of a large number of equidistant vertically placed Venetian blind-like laminae and will show a maximum light transmission vertically while the transmission will fade linearly at increasing angle in vertical plane.

If a specially shaped data window or weighting of amplitudes is desired, the oscillograph picture may be demasked by suitable greywedges.

There is nothing to prevent other data representations such as dot collections or continuous light distributions from being correspondingly treated provided that the geometric requirements are complied with.

It has been described how the calculation operations concerned can be carried out from an oscillograph picture with horizontal $x$-axis and vertical $y$-axis. Registrations may be performed in exactly the same way for other orientations just as suitable photographic data representations may be employed as computing basis.

The drawings show examples of the execution of the invention

Figure 2:
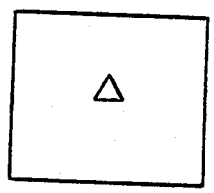
Figure 3:
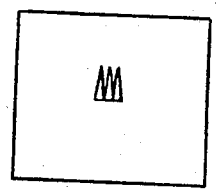
Figure 4:
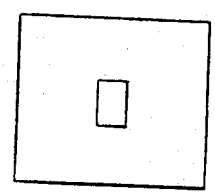
Figure 5:
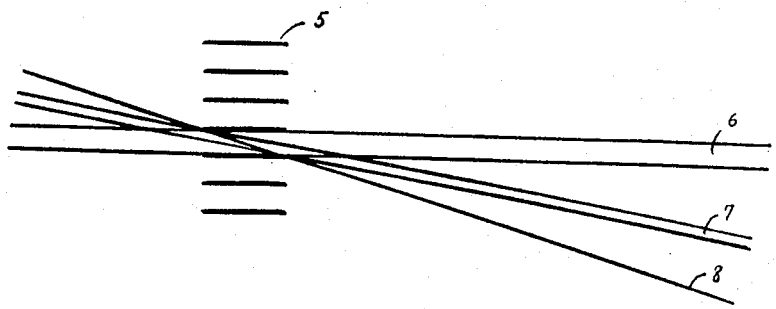

FIG. 1 showing a form of execution for the formation of arithmetical mean value, FIG. 2 and FIG. 3 showing two different slide forms for use in connection with mean value formation, FIG. 4 a slide form for median value formation, and FIG. 5 a lamina system for controlled angle distribution of light.

In FIG. 1 showing an execution form of the invention for formation of the mean value, 1 is the screen of a cathodic ray oscillograph with horizontal $x$-deflection and vertical $y$-deflection. 2 is a cylinder lens with vertical cylinder device. 3 is a slide with rhombe-shaped opening with a horizontal and vertical diagonal. 4 is a photographic film. On the oscillograph screen 1 is shown a curve with a point P, which through the cylinder lens 2 and the slide 3 is pictured in a line piece L on the film 4. The illumination along the line piece L will be most intense in center and fade linearly towards zero at the ends of the line piece.

FIG. 2 and 3 show other slide forms which may be used instead of the slide 3 in FIG. 1. Hereby the picture of the point P will be a line piece which is most intensely illuminated at the lower end point, and the illumination of which fades linearly towards the upper end point. Each curve reproduced on the oscillograph screen 1 will thus be pictured as a strip the light intensity of which varies linearly in vertical direction. Several successive or simultaneous curves will result in producing a strip-shaped exposure of the film 4, which in a certain exposure value will reproduce a curve corresponding to the arithmetical mean value, cf. (4) and (7).

FIG. 4 shows a rectangular slide. If this is inserted instead of the slide 3 of FIG. 1, the oscillographic curve will be pictured on the film 4 as a strip with uniform light intensity and a constant vertically measured strip width. Several successive or simultaneous curves on the oscillograph screen will result in a strip-shaped exposure, which along an arbitrary vertical sectional line will show a stair-shaped varying exposure. A curve through the points on the film exposed with half the maximum exposure, will represent the median value.

FIG. 5 shows how a system of laminae may be used to control the angle distribution of light. Light bundles 6, 7, and 8 show that the light transmission fades proportionally to the angle of deflection from the directly through-falling bundle 6.

What I claim and desire to secure by Letters Patent is:

1. An optical signal averaging apparatus comprising electronic means for visually displaying a plurality of signal functions including a set of coordinate axes, one of which is an amplitude axis, said displaying means being arranged to display said signal functions relative to said axes, a recording medium, lens means for projecting a portion of said visual display of each of said signal functions onto said recording medium, said lens means being of the plano-cylindrical type whereby the image of said portions will be spread in the direction of said amplitude axis on said recording medium, and means for controlling the transmission of said spread images to said recording medium including a light barrier being located between said lens means and said recording medium, said barrier having an aperture elongated in the direction of said amplitude axis and the geometric axis of said cylindrical lens so that said aperture will transmit said images in a pattern that is characteristic of an average amplitude value of said plurality of said signal functions.

2. The apparatus as claimed in claim 1 wherein the shape of said aperture is rhombic so that said average amplitude value of said pattern will be an arithmetical mean value.

3. The apparatus as claimed in claim 1 wherein the shape of said aperture is rectangular and said barrier is disposed so that two of the sides of said aperture extend in parallel relation to one of said coordinate axes so that said average amplitude value of said pattern will be a median value.

4. The apparatus as claimed in claim 1 wherein said electronic means for visually displaying a plurality of signal functions is an oscillograph.

5. The apparatus as claimed in claim 1 wherein said recording medium is a photographic film.

6. The apparatus as claimed in claim 1 wherein said light barrier is provided with a plurality of apertures in the form of slots, said slots extending parallel to one another and perpendicularly to said amplitude axis, all of said slots in said barrier having uniform dimensions including a uniform depth so that maximum light transmission will be effected for that portion of the image that is incident on a said slot perpendicularly to the plane of said barrier.

7. A method of obtaining an average amplitude value of a plurality of input signal functions comprising the steps of:

visually displaying a plurality of said input signal functions on an oscillograph of the type having a set of coordinate axes, one of which is an amplitude axis, transmitting said visual display onto a photographic recording medium through a cylindrical lens and an aperture in a light barrier arranged to optically spread said visually displayed signals in a direction parallel to said amplitude axis, said aperture being located between the lens and recording medium and being elongated in the direction of said amplitude axis as well as the geometric axis of said cylindrical lens so that said photographic recording medium will record a pattern that is characteristic of an average amplitude value of said plurality of said input signal functions.

* * * * *